United States Patent
Tanaka et al.

(10) Patent No.: US 9,841,558 B2
(45) Date of Patent: Dec. 12, 2017

(54) COLORED OPTICAL FIBER

(71) Applicant: FURUKAWA ELECTRIC CO., LTD., Tokyo (JP)

(72) Inventors: Hiroki Tanaka, Tokyo (JP); Minoru Kasahara, Tokyo (JP); Junpei Watanabe, Tokyo (JP); Kenichi Suyama, Tokyo (JP); Yoshihiro Arashitani, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/405,770

(22) Filed: Jan. 13, 2017

(65) Prior Publication Data

US 2017/0131511 A1 May 11, 2017

Related U.S. Application Data

(63) Continuation of application No. PCT/JP2015/003020, filed on Jun. 17, 2015.

(30) Foreign Application Priority Data

Jul. 29, 2014 (JP) .................. 2014-154137

(51) Int. Cl.
*G02B 6/02* (2006.01)
*C03C 25/10* (2006.01)
*G02B 6/44* (2006.01)

(52) U.S. Cl.
CPC ...... *G02B 6/02395* (2013.01); *C03C 25/1065* (2013.01); *G02B 6/4403* (2013.01); *C03C 25/102* (2013.01); *G02B 6/4482* (2013.01)

(58) Field of Classification Search
None
See application file for complete search history.

(56) References Cited

U.S. PATENT DOCUMENTS

| | | | |
|---|---|---|---|
| 6,190,483 B1 | 2/2001 | Yang et al. | |
| 7,085,465 B2 | 8/2006 | Ono et al. | |

(Continued)

FOREIGN PATENT DOCUMENTS

| | | |
|---|---|---|
| JP | 57-40203 | 3/1982 |
| JP | 6-157077 | 6/1994 |

(Continued)

OTHER PUBLICATIONS

English translation of written opinion in PCT/JP2015/003020, dated Jul. 14, 2015.*

(Continued)

*Primary Examiner* — Mike Stahl
(74) *Attorney, Agent, or Firm* — Oblon, McClelland, Maier & Neustadt, L.L.P.

(57) ABSTRACT

The present invention provides a two-layer structure colored optical fiber which includes a colored secondary coating layer improved in collectability and separability. The two-layer structure colored optical fiber in an embodiment of the present invention includes a glass optical fiber, a primary coating layer coating the glass optical fiber, and a colored secondary coating layer coating the primary coating layer. The secondary coating layer has such characteristics that a surface cure percentage is 99% or more at an infrared absorption peak of a wave number of 1407 $cm^{-1}$ and a surface kinetic friction force in Knot Test is less than 0.075 N.

8 Claims, 6 Drawing Sheets

(56) References Cited

U.S. PATENT DOCUMENTS

| | | | |
|---|---|---|---|
| 2002/0146225 A1 | 10/2002 | Bulters et al. | |
| 2003/0169989 A1* | 9/2003 | Abel | C03C 25/1065 385/128 |
| 2010/0296780 A1* | 11/2010 | Schiaffo | G02B 6/02395 385/114 |
| 2017/0131511 A1* | 5/2017 | Tanaka | G02B 6/4482 |

FOREIGN PATENT DOCUMENTS

| | | |
|---|---|---|
| JP | 7-277775 | 10/1995 |
| JP | 8-81239 | 3/1996 |
| JP | 9-328632 | 12/1997 |
| JP | 2000-55806 | 2/2000 |
| JP | 2000-516907 | 12/2000 |
| JP | 2003-322775 | 11/2003 |
| JP | 2004-131632 | 4/2004 |
| JP | 2004-514745 | 5/2004 |
| JP | 2005-350310 | 12/2005 |
| JP | 2010-210711 | 9/2010 |
| JP | 2012-56823 | 3/2012 |
| JP | 2013-116843 | 6/2013 |

OTHER PUBLICATIONS

International Search Report dated Jul. 14, 2015 in PCT/JP2015/003020 filed Jun. 17, 2015 (with English translation).
Written Opinion dated Jul. 14, 2015 in PCT/JP2015/003020 filed Jun. 17, 2015.

* cited by examiner

COLORED OPTICAL FIBER

CROSS-REFERENCES TO RELATED APPLICATIONS

This application is a continuation application of International Application No. PCT/JP2015/003020, filed Jun. 17, 2015, which claims the benefit of Japanese Patent Application No. 2014-154137, filed Jul. 29, 2014. The contents of the aforementioned applications are incorporated herein by reference in their entireties.

TECHNICAL FIELD

The present invention relates to a colored optical fiber housed in an optical fiber cable and relates to a two-layer structure colored optical fiber including a primary coating layer and a colored secondary coating layer coating the primary coating layer.

BACKGROUND ART

Shift of communication media from conventional copper wires to optical fiber cables has been in progress to achieve high-speed communication in the Internet and corporate networks.

In general, an optical fiber is made of silica glass or the like and is vulnerable to external force. For this reason, it is common practice to cover the periphery of the optical fiber with two protection coating layers, that is, a primary coating layer and a secondary coating layer, and thereby to protect the optical fiber from external force and an environment which may affect the characteristics of the optical fiber.

Furthermore, it is desirable that optical fibers be distinguishable from each other from the view point of work efficiency in installation and the like. However, the protection coating layers are generally clear and colorless. Thus, a colored layer as a tertiary coating layer is generally provided on the outer periphery of the secondary coating layer. An optical fiber provided with such a colored layer is referred to as a colored optical fiber.

Figure 9:
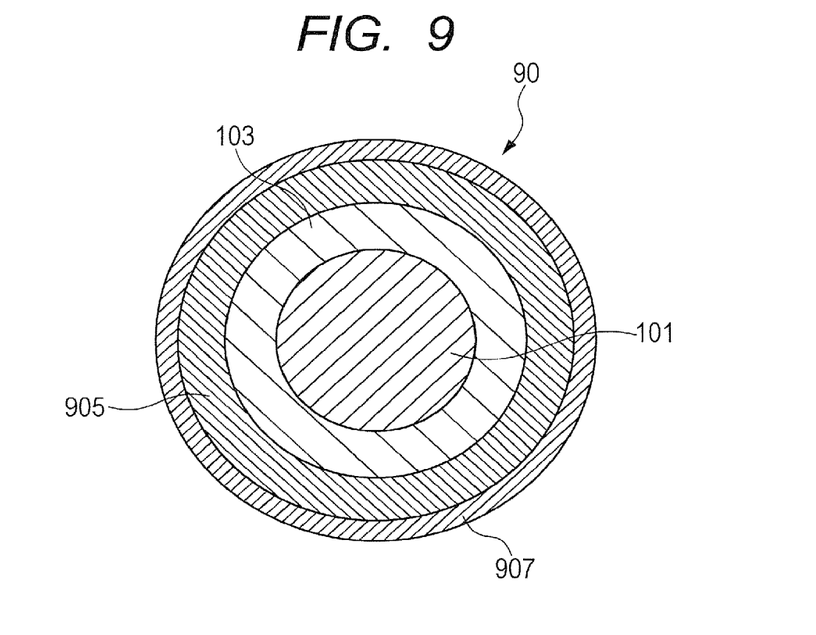
FIG. 9 is a cross-sectional view of a three-layer structure colored optical fiber in a conventional technique.

FIG. 9 is a cross-sectional view of a three-layer structure colored optical fiber 90 in a conventional technique. The three-layer structure colored optical fiber 90 includes a glass optical fiber 101, a primary coating layer 103, an uncolored secondary coating layer 905, and a colored layer 907. The glass optical fiber 101 is made of silica glass. The primary coating layer 103, the uncolored secondary coating layer 905, and the colored layer 907 are made of ultraviolet curing resin and formed around the glass optical fiber 101 in this order. The colored layer 907 is made of an epoxy acrylate-based resin. Since the uncolored secondary coating layer 905 is not colored, the secondary coating layer 905 is clear and colorless.

Meanwhile, there is proposed a two-layer structure colored optical fiber having a structure with no colored layer. In such a colored optical fiber, the primary coating layer or the secondary coating layer is colored. Accordingly, there is no need to additionally provide the colored layer and diameter reduction of the optical fiber can be achieved. For example, Patent Document 1 discloses a colored optical fiber which includes a primary coating layer and a secondary coating layer and in which the primary coating layer is colored.

In an optical fiber cable using the colored optical fibers, easy take-out of the colored optical fibers brings about a great effect on work efficiency in operations such as installation and after-branching of the optical fiber cable.

CITATION LIST

Patent Document

Patent Document 1: Japanese Patent Application Laid-Open No. S57-40203
Patent Document 2: Japanese Patent Application Laid-Open No. 2000-55806
Patent Document 3: Japanese Patent Application Laid-Open No. 2005-350310
Patent Document 4: Japanese Patent Application Laid-Open No. 2010-210711
Patent Document 5: Japanese Patent Application Laid-Open No. 2003-322775

SUMMARY OF INVENTION

Surface tackiness of the outermost layer of the conventional two-layer structure colored optical fiber is higher than that of the three-layer structure colored optical fiber. This leads to large friction force on the surface, so that the conventional two-layer structure colored optical fiber is poor in slippage and has a problem with collectability in the case of manufacturing the optical fiber cable.

Moreover, in the optical fiber cable using the colored optical fibers, easy take-out of the colored optical fibers brings about a great effect on work efficiency in operations such as installation and after-branching of the optical fiber cable. However, the conventional two-layer structure colored optical fiber has such high adhesiveness on the surface that an optical fiber ribbon manufactured with multiple colored optical fibers arranged in parallel and collectively coated has a problem of poor separability of each colored optical fiber from the optical fiber ribbon.

The present invention has been made in view of the problems described above, and an object of the present invention is to provide a two-layer structure colored optical fiber which includes a colored secondary coating layer improved in collectability and separability.

A first aspect of the present invention is a two-layer structure colored optical fiber comprising: a glass optical fiber; a primary coating layer coating the glass optical fiber; and a colored secondary coating layer coating the primary coating layer, a surface cure percentage of the colored secondary coating layer being 99% or more at an infrared absorption peak of a wave number of 1407 cm$^{-1}$, a difference in the surface cure percentage between a portion near a surface of the colored secondary coating layer and a portion near an interface between the primary coating layer and the colored secondary coating layer being 3.0% or less, a surface kinetic friction force in Knot Test of the colored secondary coating layer being less than 0.075 N.

A second aspect of the present invention is a manufacturing method of a two-layer structure colored optical fiber, comprising the steps of: coating a glass optical fiber with a primary coating layer; and coating the primary coating layer with a colored secondary coating layer, a surface cure percentage of the colored secondary coating layer being 99% or more at an infrared absorption peak of a wave number of 1407 cm$^{-1}$, a difference in the surface cure percentage between a portion near a surface of the colored secondary coating layer and a portion near an interface between the primary coating layer and the colored secondary coating layer being 3.0% or less, a surface kinetic friction force in Knot Test of the colored secondary coating layer being less than 0.075 N.

The present invention has an effect of achieving a two-layer structure colored optical fiber improved in collectability in manufacturing of an optical fiber cable and improved in separability from the optical fiber cable.

DESCRIPTION OF EMBODIMENTS

An embodiment of the present invention is described below with reference to the drawings. However, the present invention is not limited by the embodiment. Note that, in the drawings to be described below, parts with the same functions are denoted by the same reference numerals and overlapping description thereof is omitted in some cases.

Figure 1:
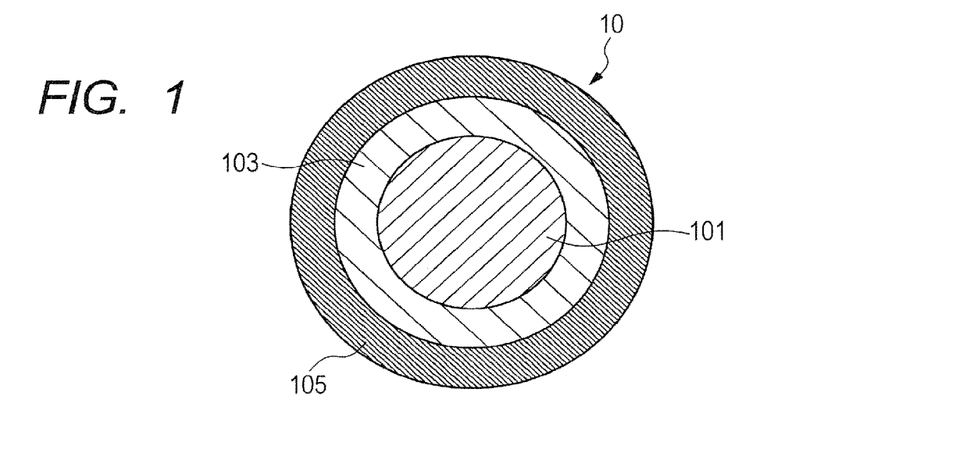
FIG. 1 is a cross-sectional view of a two-layer structure colored optical fiber in an embodiment of the present invention.

FIG. 1 is a cross-sectional view of a two-layer structure colored optical fiber 10 in the embodiment of the present invention. The two-layer structure colored optical fiber 10 includes a glass optical fiber 101, a primary coating layer 103, and a colored secondary coating layer 105. The glass optical fiber 101 is made of silica glass and the primary coating layer 103 and the colored secondary coating layer 105 are formed on a periphery of the glass optical fiber 101 in this order. The primary coating layer 103 and the colored secondary coating layer 105 are made of an ultraviolet curing resin. The colored secondary coating layer 105 is colored with a pigment or the like to facilitate distinguishing of the optical fiber in work. Organic pigments such as phthalocyanine, quinacridone, dioxane, and benzimidazolone as well as inorganic pigments such as carbon black and titanium oxide can be used as the pigment.

The outer diameter of the glass optical fiber 101 is 80 μm to 125 μm (preferably 125 μm), the outer diameter of the primary coating layer 103 is 120 μm to 200 μm (preferably 183 μm), and the outer diameter of the colored secondary coating layer 105 is 160 μm to 255 μm (preferably 242 μm). The two-layer structure colored optical fiber 10 is different from the three-layer structure colored optical fiber 90 illustrated in FIG. 9 in that the secondary coating layer is colored and the colored optical fiber 10 includes no colored layer 907. Accordingly, the two-layer structure colored optical fiber 10 can be made thinner than the three-layer structure colored optical fiber including the colored layer, by an amount corresponding to a film thickness of the colored layer 907.

The ultraviolet curing resin used in the primary coating layer 103 and the colored secondary coating layer 105 contains an oligomer, a diluent monomer, a photoinitiator, a sensitizer, a pigment, and various additives. Since the oligomer has a large molecular weight and high viscosity and is thus difficult to handle, the monomer or the like is added as a diluent. A polyether-based urethane acrylate, epoxy acrylate, polyester acrylate, silicon acrylate, and the like can be used as the oligomer. Moreover, a monofunctional monomer and a multifunctional monomer can be used as the diluent monomer.

A surface cure percentage of the colored secondary coating layer 105 of the two-layer structure colored optical fiber 10 in the embodiment of the present invention is 99% or higher at an infrared light absorption peak of a wave number of 1407 cm$^{-1}$ to be described later. A difference in the surface cure percentage between a portion near an outermost peripheral surface and a portion near an inner peripheral surface of the colored secondary coating layer 105 is 3.0% or less, and a surface kinetic friction force in Knot Test to be described later is less than 0.075 N.

An optical fiber contains a modified silicone in a coating layer of an outermost layer. In the two-layer structure colored optical fiber 10, a content of the modified silicone in the secondary coating layer which is the outermost layer of the optical fiber 10 is less than a content of the modified silicone in the colored layer which is the outermost layer of the three-layer structure colored optical fiber.

In order to satisfy the surface cure percentage and the surface kinetic friction force described above, it is preferable to use a modified silicone with kinetic viscosity of 100 mm$^2$/S or more and set the content of the modified silicone to, for example, 2% or more and 5% or less. Moreover, two or more types of modified silicones may be used together.

Principles of curing of the ultraviolet curing resin are described below. Irradiating the ultraviolet curing resin with ultraviolet light causes decomposition and cleavage of the photoinitiator in the ultraviolet curing resin and radicals are generated. Addition of the generated radicals to unsaturated double bonds of the reactive oligomer or the reactive monomer occurs and cross-linking reaction proceeds. Along with the proceeding of the cross-linking reaction, acrylic double bonds in the ultraviolet curing resin are consumed. A double bond reaction percentage can be thus obtained by evaluating the amount of the consumed acrylic double bonds after the curing reaction (after the irradiation with the ultraviolet light), based on the amount of acrylic double bonds in the uncured ultraviolet curing resin. The double bond reaction percentage is useful as an index of a cure degree of the ultraviolet curing resin (that is, the surface cure percentage).

Moreover, the cross-linking reaction of the ultraviolet curing resin proceeds most effectively when the temperature in the ultraviolet irradiation is near the glass-transition temperature of the ultraviolet curing resin. However, when the temperature excessively rises due to irradiance of the ultraviolet irradiation, the material temperature, the reaction heat of the resin, and the like, termination reaction becomes dominant over the cross-linking reaction of radicals and the cross-linking reaction is resultantly terminated.

The glass-transition temperature of the ultraviolet curing resin can be appropriately adjusted by adjusting the skeletal structure and molecular weight of the oligomer and by adjusting the type and amount of the diluent monomer to be added. For example, it is possible to raise the glass-transition temperature of the ultraviolet curing resin and adjust the Young's modulus by reducing the molecular weight of the oligomer or by increasing the functional groups of the monomer.

Moreover, as described above, radicals are generated by irradiating the ultraviolet curing resin with the ultraviolet light. However, when oxygen exists in an atmosphere in which the irradiation is performed, the radicals react with oxygen rather than with the monomer and peroxide radicals are formed. Since the peroxide radicals are stable radicals, reactivity thereof is low and the cross-linking reaction of the ultraviolet curing resin is terminated. The oxygen concentration in the atmosphere during the ultraviolet irradiation is thus an important factor determining the surface cure degree of the ultraviolet curing resin.

In order to satisfy the surface cure percentage and the surface kinetic friction force described above, it is preferable that an inert gas is introduced into a ultraviolet irradiation apparatus in formation of the colored secondary coating layer 105 to reduce the oxygen concentration in the atmosphere as much as possible and the oxygen concentration is set to zero particularly in the atmosphere which comes into direct contact with an optical fiber surface. Helium, argon, nitrogen, and the like can be used as the inert gas. As a result, the colored secondary coating layer 105 with high surface cure degree can be formed.

Figure 10A:
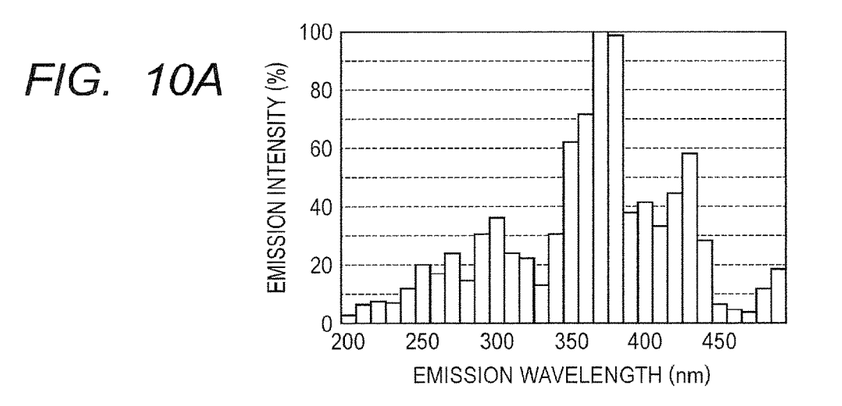
FIG. 10A is a view depicting a graph of an emission spectrum of an ultraviolet light source.
Figure 10B:
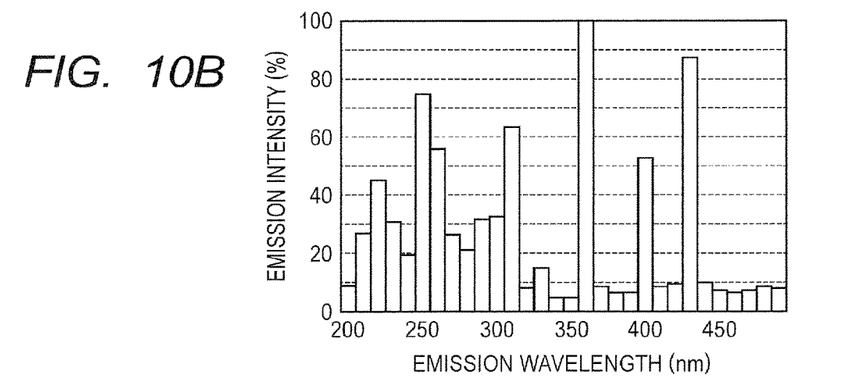
FIG. 10B is a view depicting a graph of an emission spectrum of an ultraviolet light source.
Figure 10C:
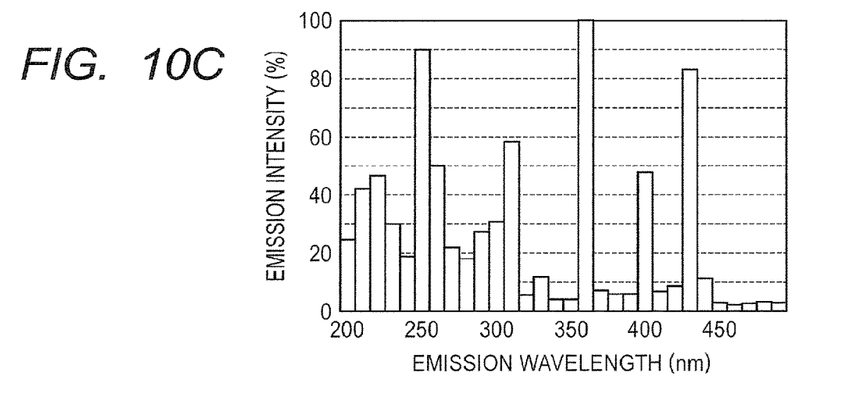
FIG. 10C is a view depicting a graph of an emission spectrum of an ultraviolet light source.

A type of preferable photoinitiator (photopolymerization initiator) varies depending on a type of an ultraviolet light source. FIGS. 10A to 10C are views depicting graphs of emission spectra of ultraviolet light sources. The horizontal axes of FIGS. 10A to 10C represent an emission wavelength, and the vertical axes thereof represent a ratio of emission intensity (the maximum emission intensity is assumed to be 100%). FIG. 10A depicts the emission spectrum of a D bulb, FIG. 10B depicts the emission spectrum of an H bulb, and FIG. 10C depicts the emission spectrum of an H+ bulb.

The D bulb is an ultraviolet light source with an emission spectrum equivalent to a metal halide lamp. The H bulb is an ultraviolet light source with an emission spectrum equivalent to a high-pressure mercury lamp. The H+ bulb is an ultraviolet light source with higher emission intensity than the H bulb in a short wavelength region.

In the H bulb, the emission intensity in a short wavelength region (for example, 200 to 350 nm) is greater than that in a long wavelength region (for example, 350 to 450 nm). The emission intensity of the H+ bulb in a region of 200 to 280 nm is 15% greater than that in the H bulb in average. Accordingly, the H+ bulb is effective for improving the surface curing. Meanwhile, in the D bulb, the emission intensity in the long wavelength region is greater than that in the short wavelength region. Short wavelength ultraviolet light is effective for curing a portion of the optical fiber near the surface while long wavelength ultraviolet light is effective for curing a deep portion of the optical fiber away from the surface. Accordingly, it is possible to efficiently cause curing reaction in both of the near-surface portion and the deep portion of the optical fiber by selecting the ultraviolet light sources in accordance with the absorption peak of the photoinitiator blended into the ultraviolet curing resin and matching the wavelength of strong emission intensity in the emission spectrum with the absorption peak wavelength of the photoinitiator.

Photoinitiators effective for curing the portion close to the surface of the optical fiber are, for example, hydroxy ketone-based photoinitiators. The hydroxy ketone-based photoinitiators include 1-hydroxycyclohexyl-phenyl-ketone, 2-hydroxy-2-methyl-1-phenyl-propane-1-one, 2-hydroxy-1-{4-[4-(2-hydroxy-2-methyl-propionyl)-benzyl]phenyl}-2-methyl-propanone-1-one, and the like. Since these photoinitiators have strong absorption peak in a region of 220 to 300 nm, the H bulb or the H+ bulb having strong emission intensity in the short wavelength region are effective.

Photoinitiators effective for curing the deep portion of the optical fiber away from the surface are, for example, α-amino ketone-based photoinitiators and acylphosphine oxide-based photoinitiators. The α-amino ketone-based photoinitiators include 2-methyl-1-(4-methylthiophenyl)-2-morpholinopropan-1-one which has a strong absorption peak in a region of 260 to 340 nm, 2-benzyl-2-dimethyl-amino-1-(4-morpholinophenyl)-butanone-1 which has an absorption peak in a region of 260 to 400 nm, and the like. The D bulb having a strong emission intensity peak in the long wavelength region is effective for these photoinitiators.

The acylphosphine oxide-based photoinitiators include 2,4,6-trimethylbenzoyl-diphenyl-phosphine oxide, bis(2,4,6-trimethylbenzoyl)-phenylphosphine oxide, and the like. Since these photoinitiators have strong absorption peaks in a region of 260 to 440 nm, the D bulb having strong emission intensity in the long wavelength region is effective. Moreover, the acylphosphine oxide-based photoinitiators have a bleaching effect in which absorption disappears due to decomposition. Accordingly, the cure degree can be increased not only in the surface but also in the deep portion. Specifically, although the acylphosphine oxide-based photoinitiators absorb light in the long wavelength region (around 385 nm) at the start of the ultraviolet irradiation, the absorption in the long wavelength region disappears with progress of the photopolymerization reaction. Accordingly, when the photopolymerization progresses, the ultraviolet light reaches the deep portion and the cure degree of the deep portion can be increased.

Moreover, a light absorption coefficient ($\epsilon$) at 405 nm can be increased by using 2-methyl-1-(4-methylthiophenyl)-2-morpholinopropan-1-one and 2-benzyl-2-dimethylamino-1-(4-morpholinophenyl)-butanone-1 which are the α-amino ketone-based photoinitiators described above, together with the 2,4 diethyl thioxanthone which is a thioxanthone-based photoinitiator absorbing light in a range of 260 to 410 nm. This contributes to curing of the deep portion and allows the curing reaction to occur more efficiently.

The cure degrees in the surface and the interior portion can be increased by using, as a combination of these photoinitiators, for example, a combination of the hydroxyl ketone-based photoinitiator which has a strong absorption peak in the short wavelength region and at least one of the α-amino ketone-based photoinitiators and the acylphosphine oxide-based photoinitiators which have absorption peaks in the long wavelength region. Moreover, adding the thioxanthone-based photoinitiator to the combination of the hydroxyl ketone-based photoinitiator and the α-amino ketone-based photoinitiator raises the absorption peak in the long wavelength region (particularly at 405 nm described above). Accordingly, the cure degree of the deep portion can be further increased.

In addition to the use of the photoinitiators in combination as described above, multiple ultraviolet light sources with different emission spectra are preferably used together, specifically, the ultraviolet light source (H bulb or H+ bulb) having strong emission intensity in the short wavelength region and the ultraviolet light source (D bulb) having strong emission intensity in the long wavelength region are used together. This can further improve the cure degree in both of the near-surface portion and the deep portion of the ultraviolet curing resin.

Figure 11:
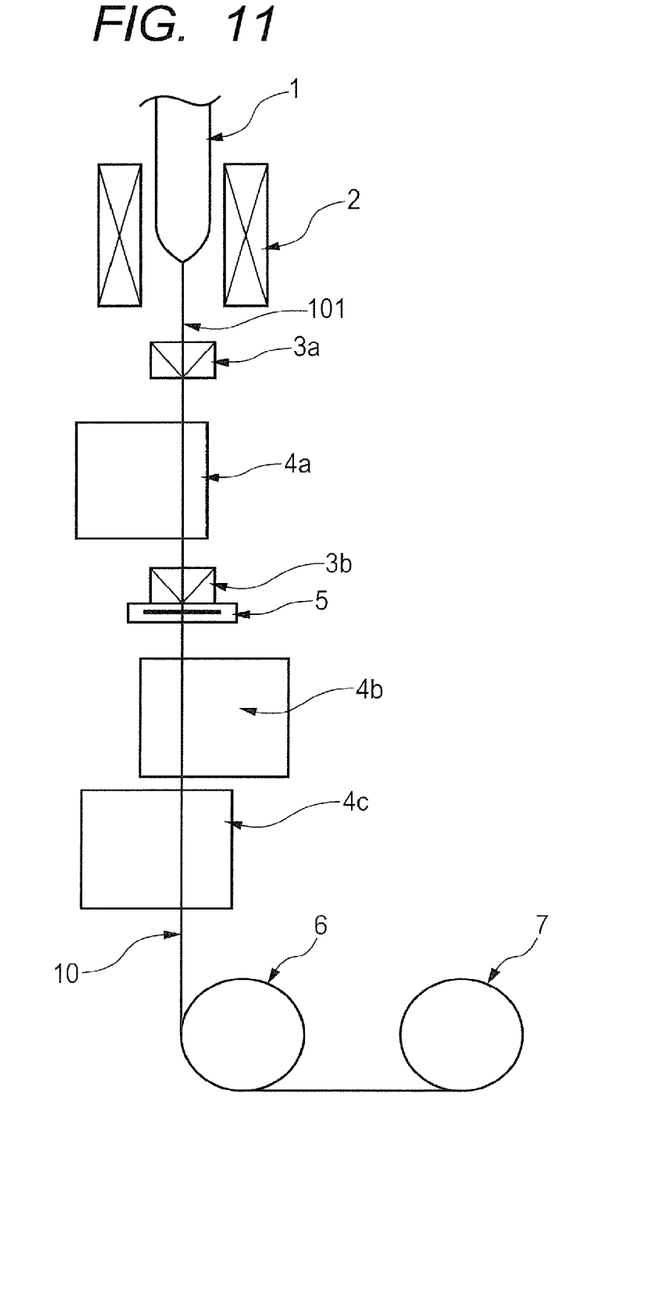
FIG. 11 is a schematic view illustrating a manufacturing method of the two-layer structure colored optical fiber in an embodiment of the present invention.

FIG. 11 is a schematic view illustrating a manufacturing method of the two-layer structure colored optical fiber 10 in the embodiment of the present invention. First, a heater 2 heats an optical fiber base material 1 and the glass optical fiber 101 is taken out. Next, a first resin coating apparatus 3a applies a material of the primary coating layer 103 onto an outer periphery of the glass optical fiber 101, and a first ultraviolet irradiation apparatus 4a irradiates the primary coating layer 103 with ultraviolet light to cure the primary coating layer 103. The first resin coating apparatus 3a is, for example, a die filled with the material of the primary coating layer 103. An ultraviolet light source having an emission spectrum close to an absorption spectrum of the photoinitiator contained in the primary coating layer 103 is desirably used as the first ultraviolet irradiation apparatus 4a.

Next, a second resin coating apparatus 3b applies a material of the colored secondary coating layer 105 onto the outer periphery of the glass optical fiber 101 coated with the primary coating layer 103. The second resin coating apparatus 3b is, for example, a die filled with the material of the colored secondary coating layer 105, and the die is maintained at a predetermined temperature by a heater 5.

Thereafter, a second ultraviolet irradiation apparatus 4b and a third ultraviolet irradiation apparatus 4c sequentially irradiate the glass optical fiber 101 to which the material of the colored secondary coating layer 105 is applied, with ultraviolet light to cure the colored secondary coating layer 105. In this case, the second ultraviolet irradiation apparatus 4b includes an ultraviolet light source (H bulb or H+ bulb) having stronger emission intensity in the short wavelength region than in the long wavelength region. Meanwhile, the third ultraviolet irradiation apparatus 4c includes an ultraviolet light source (D bulb) having stronger emission intensity in the long wavelength region than in the short wavelength region. Irradiation with ultraviolet light from multiple ultraviolet light sources with different emission spectra as described above can increase the cure degree in both of the portion close to the surface and the deep portion away from the surface of the colored secondary coating layer 105.

The two-layer structure colored optical fiber 10 in the embodiment of the present invention is formed by the steps described above. Lastly, the colored optical fiber 10 is taken up by a take-up apparatus 7 via a guide roller 6.

In the manufacturing method of the two-layer structure colored optical fiber 10 illustrated in FIG. 11, the coating and curing of the primary coating layer 103 is performed and then the coating and curing of the colored secondary coating layer 105 is performed. Accordingly, the method has an advantage that the primary coating layer 103 is easily sufficiently cured.

As another embodiment, the primary coating layer 103 and the colored secondary coating layer 105 of the colored optical fiber 10 can be coated in one operation. In this case, the glass optical fiber 101 is coated with the material of the primary coating layer 103 and the material of the colored secondary coating layer 105 and then the primary coating layer 103 and the colored secondary coating layer 105 are irradiated with ultraviolet light to be cured. In this case, there is a risk that a sufficient amount of ultraviolet light does not reach the primary coating layer 103 due to absorption of ultraviolet light in the colored secondary coating layer 105 and the primary coating layer 103 is not sufficiently cured. Accordingly, it is desirable to use photoinitiators with different absorption spectra (that is, photoinitiators whose respective strong absorption peaks exist in different wavelength regions) for the primary coating layer 103 and the colored secondary coating layer 105 and also use the ultraviolet light source (H bulb or H+ bulb) having strong emission intensity in the short wavelength region and the ultraviolet light source (D bulb) having strong emission intensity in the long wavelength region together. This can increase not only the cure degree of the colored secondary coating layer 105 but also the cure degree of the primary coating layer 103.

Moreover, the colored secondary coating layer 105 can be efficiently cured by setting the temperature of the colored secondary coating layer 105 in the ultraviolet irradiation to a temperature equal to or higher than the glass-transition temperature, that is, 83° C. or higher. Meanwhile, when the temperature of the colored secondary coating layer 105 is set higher than 140° C., the temperature is too high with respect to the relatively-low glass-transition temperature of the primary coating layer 103 and the curing reaction of the primary coating layer 103 is terminated. Accordingly, a preferable temperature range of the colored secondary coating layer 105 in the curing reaction is 83° C. or higher and 140° C. or lower. The temperature of the colored secondary coating layer 105 is a temperature obtained by adding a heat generation amount in the curing reaction by the ultraviolet irradiation to the temperature of the die 3b in FIG. 11 (that is, the temperature of the material of the colored secondary coating layer 105).

In this case, the heat generation amount in the curing reaction by the ultraviolet irradiation of the ultraviolet curing resin is a heat generation amount in the curing reaction of the ultraviolet curing resin obtained by DSC (differential scanning calorimetry) when the ultraviolet curing resin is irradiated with ultraviolet light at irradiance of 1000 mW/cm$^2$ for one second in a helium atmosphere. For example, DSC 822 of Mettler-Toledo International Inc. can be used for the measurement of the heat generation amount. For example, when the material of the colored secondary coating layer 105 is applied at the die temperature of 50° C., the heat generation amount is 200 (J/g), and heat generation amount 200 (J/g)/(specific heat 2.0 (J/[g·K])×specific gravity 1.1)=90 K(° C.). Specifically, the temperature of the material of the colored secondary coating layer 105 increase by 90° C. from the die temperature of 50° C. in the curing of the resin by the ultraviolet irradiation, and reaches 140° C. which is within the preferable temperature range described above. The temperature of the die 3b can be set to a preferable temperature for the material of the colored secondary coating layer 105, based on the temperature of the die and the heat generation amount in the curing reaction by the ultraviolet irradiation as described above.

Increasing the cure degree of the ultraviolet curing resin by adjusting the modified silicone and photoinitiator contained in the colored secondary coating layer 105, the ultraviolet light sources, and the temperature of the colored secondary coating layer 105 as described above can reduce the surface kinetic friction force.

Figure 5:
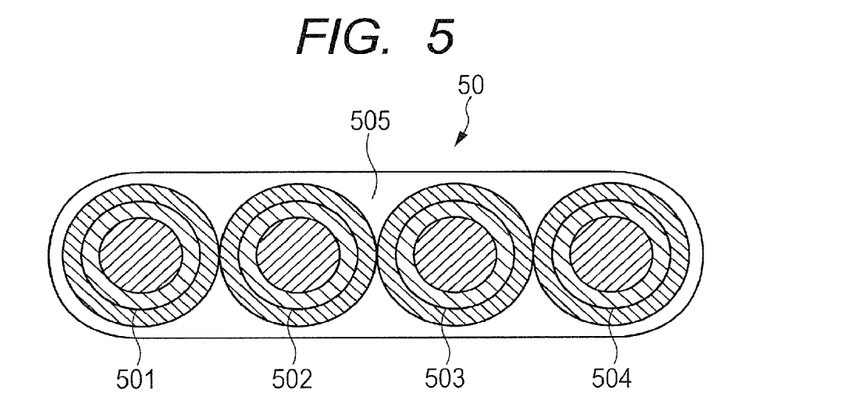
FIG. 5 is a cross-sectional view of an optical fiber ribbon in an embodiment of the present invention.

Note that the two-layer structure colored optical fiber 10 in the present invention can be used as an optical fiber ribbon. FIG. 5 is a cross-sectional view of an optical fiber ribbon 50 in the embodiment of the present invention. The optical fiber ribbon 50 includes a collective coating layer 505 and four two-layer structure colored optical fibers 501 to 504 each having the configuration of the two-layer structure colored optical fiber 10. Specifically, the four colored optical fibers 501 to 504 are arranged parallel to each other and are coated with the collective coating layer 505. The collective coating layer 505 is made of a tape resin which is made of an ultraviolet curing resin. Since the configuration of each of the colored optical fibers 501 to 504 is the same as the configuration of the two-layer structure colored optical fiber 10 illustrated in FIG. 1, description thereof is omitted.

The optical fiber ribbon 50 configured as described above has excellent collectability and can be easily manufactured due to excellent slippage of the two-layer structure colored optical fiber 10 in the embodiment of the present invention. Moreover, the optical fiber ribbon 50 has excellent separability due to the excellent slippage.

Figure 8:
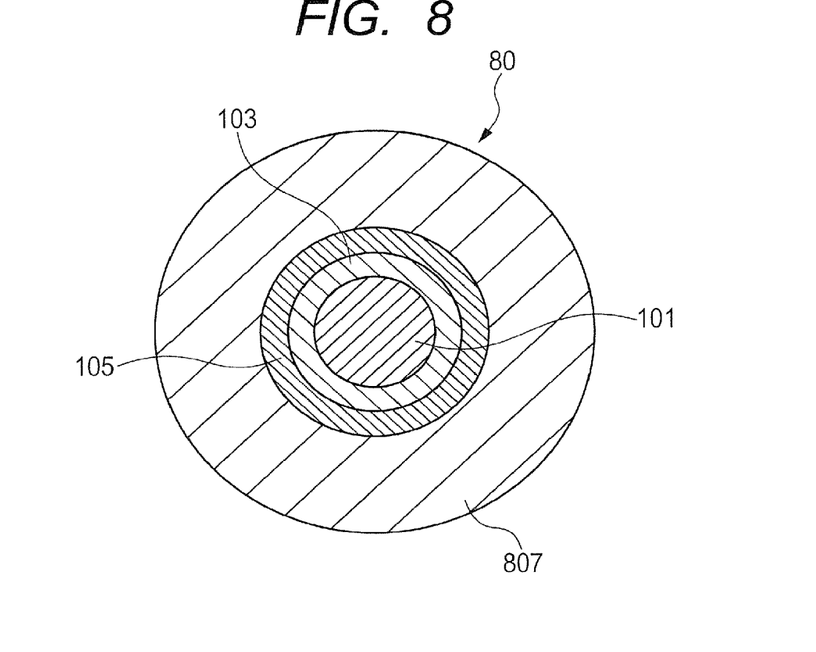
FIG. 8 is a cross-sectional view of an overcoat optical fiber using the two-layer structure colored optical fiber in an embodiment of the present invention.

Furthermore, the two-layer structure colored optical fiber 10 in the present invention can be used as an overcoat optical fiber by coating the outermost layer of the colored optical fiber 10 with an overcoat layer. Specifically, the diameter of the optical fiber is generally about 250 μm. In this state, the optical fiber is difficult to handle due to its small diameter and workability in manual work is poor. In view of this, the overcoat layer is further formed on the colored secondary coating layer 105 of the two-layer structure colored optical fiber 10 to form the overcoat optical fiber with a larger diameter and thereby improve the workability.

FIG. 8 is a cross-sectional view of an overcoat optical fiber 80 using the two-layer structure colored optical fiber 10 in the embodiment of the present invention. Since the two-layer structure colored optical fiber 10 is the same as that illustrated in FIG. 1, description thereof is omitted. An overcoat layer 807 is formed on the colored secondary coating layer 105 of the two-layer structure colored optical fiber 10. The overcoat layer 807 can be made of an ultraviolet curing resin. The ultraviolet curing resin may contain an oligomer, a diluent monomer, a photoinitiator, and an additive, and the like. The outer diameter of the overcoat layer 807 is 470 μm to 530 μm (preferably, 500 μm). The overcoat optical fiber 80 formed as described above can be easily manufactured due to the excellent slippage of the two-layer structure colored optical fiber 10 in the embodiment of the present invention. Moreover, the excellent slippage can further improve the workability in manual work.

EXAMPLES

Six types of two-layer structure colored optical fibers were manufactured in the method described above (hereafter, referred to as Examples 1 to 6). Note that the material characteristics of the colored optical fibers of Examples 1 to 6 were varied by varying the skeletal structure and molecular weight of the oligomer and varying the type and amount of the added diluent monomer to adjust the glass-transition temperature Tg of the secondary coating layer. Note that the glass-transition temperature Tg can be raised by reducing the molecular weight of the oligomer or by increasing the functional groups of the monomer. Moreover, the thickness of the secondary coating layer in each example were adjusted such that the colored optical fibers in Examples 1 to 4 had a small diameter (242 μm) and the colored optical fibers in Examples 5 and 6 had a large diameter (252 μm).

COMPARATIVE EXAMPLES

Moreover, there were prepared conventional two-layer structure colored optical fibers (hereafter, referred to as Comparative Examples 1 and 2), two types of two-layer structure uncolored optical fibers (hereafter, referred to as Comparative Examples 3 and 4), and three types of conventional three-layer structure colored optical fibers (hereafter, referred to as Comparative Examples 5 to 7).

Here, the two-layer structure uncolored optical fibers (Comparative Examples 3 and 4) were each formed by using the same processes as those for the two-layer structure colored optical fiber 10, except that a different material was used for the secondary coating layer to form an uncolored secondary coating layer (not illustrated) instead of the colored secondary coating layer 105.

Characteristic tests to be described below were performed for each of the uncolored optical fibers and the colored optical fibers in the examples and comparative examples described above, and the characteristics of these optical fibers were evaluated. Note that, in the following description of the characteristic tests, the uncolored optical fibers and the colored optical fibers are collectively referred to as optical fibers.

<Measurement of Young's Modulus of Primary Coating Layer>

The Young's modulus (In-situ Modulus, ISM) of the primary coating layer of each optical fiber was measured in the following method. First, about 5 mm of the primary coating layer and the secondary coating layer is stripped off in an intermediate portion of the optical fiber by using a stripper. Then, one end of the optical fiber on which coating is formed is fixed onto a slide glass with adhesive and load is applied to another end of the optical fiber on which coating is formed. In this state, displacement δ of the primary coating layer at the boundary between a portion where the coating is stripped off and a portion where the coating is formed is read by using a microscope. The weight of the load was set to 10, 20, 30, 50 and 70 gf and a graph of the displacement relative to the weight was created. The Young's modulus of the primary coating layer was calculated by using the tilt obtained from the graph and Formula 1.

[Math 1]

$$Ep = \left(\frac{3F}{\delta}\right)\left(\frac{1}{2\pi l}\right)\ln\left(\frac{R_2}{R_1}\right) \quad \text{Formula 1}$$

In this formula, Ep is the Young's Modulus of the primary coating layer, F/δ is the tilt indicated by the graph of the displacement relative to the weight, l is a sample length, and $R_2/R_1$ is a ratio of the outer diameter ($R_2$) of the primary coating layer to the outer diameter ($R_1$) of the glass optical fiber. The outer diameter of the primary coating layer and the outer diameter of the glass optical fiber were measured by observing, with a microscope, the cross section of the optical fiber cut by using a fiber cutter.

<Measurement of Young's Modulus of Two-Layer Structure and Three-Layer Structure Optical Fibers>

A sample obtained by pulling out the glass optical fiber from the optical fiber and including only the coating was created by immersing each optical fiber in liquid nitrogen and stripping off the coating with a stripper. An end portion of this sample was fixed to an aluminum plate with adhesive. An aluminum plate portion was chucked by using a TENSILON universal tensile tester in an atmosphere in which the temperature was 23° C. and the relative humidity was 55%. Next, the sample was pulled at a pulling rate of 1 mm/min with a gauge interval being 25 mm, and the force at elongation of 2.5% was measured to calculate the tensile Young's modulus.

<Measurement of Cure Percentage of Ultraviolet Curing Resin>

It is known that a surface condition of the optical fiber depends greatly on the cure degree of the outermost layer of the optical fiber. A high-speed Fourier transform infrared spectroscopy (FT-IR) has been conventionally used as the method of evaluating the cure degree of the outermost layer. In this FT-IR method, the cure degree of the outermost layer can be evaluated by using data on an absorption peak of a molecular structure contributing to the curing reaction of the outermost layer before and after the curing reaction and data on a reference peak of a molecular structure not contributing to the curing reaction before and after the curing reaction. For example, Patent Documents 2 and 3 each disclose a manufacturing method of an optical fiber in which the cure degree of an uncolored outermost layer is evaluated by using the FT-IR method and conditions for curing the outermost layer are adjusted.

For each of the prepared optical fibers, the percentage of acrylic double bond reaction in the ultraviolet curing resin was measured in micro-ATR (Attenuated Total Reflection) measurement using the FT-IR method, and the cure percentage of the optical fiber was evaluated. The ATR measurement is quantitative measurement performed in a depth direction of a sample. In the ATR measurement, a crystal with a higher refractive index than the sample is brought into contact with the sample, infrared light is made to enter the sample, and a spectrum absorbed by the sample and reflected by the crystal is measured. Note that a penetration amount in the depth direction of the sample can be changed by using a crystal with a different refractive index. The penetration amount can be calculated by using the Snell's law described in Formula 2.

[Math 2]

$$dp = \frac{\lambda}{2\pi n_1 \sqrt{\sin^2\theta - \left(\frac{n_2}{n_1}\right)^2}} \quad \text{Formula 2}$$

Figure 2:
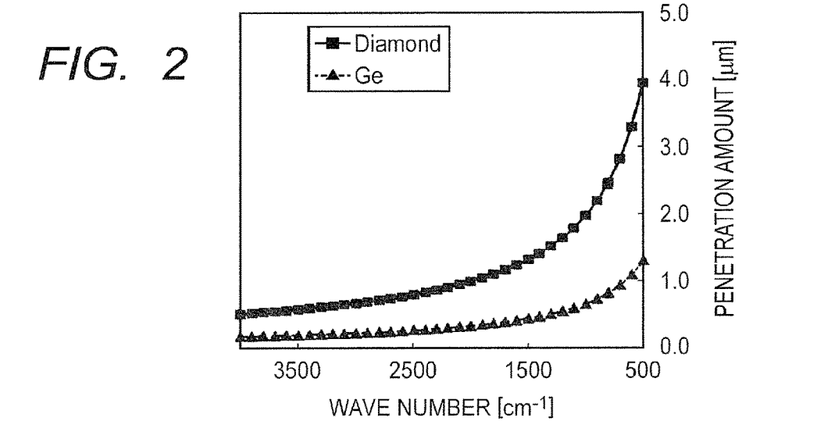
FIG. 2 is a graph depicting relationships between a wave number and a penetration amount in the cases were a diamond crystal and a germanium crystal are used in ATR measurement.

In this formula, dp is the penetration amount, λ is the wavelength of the infrared light, $n_1$ is the refractive index of the crystal, $n_2$ is the refractive index of the sample, θ is the incidence angle of the infrared light. As is apparent from Formula 2, a relationship between the wave number of the infrared light and the penetration amount in the ATR measurement depends on the used crystal. Table 1 depicts the refractive indices of typical ATR crystals. Moreover, FIG. 2 depicts relationships between the wave number and the penetration amount in the cases where a diamond crystal and a germanium crystal are used in the ATR measurement. The ATR measurement can be performed at various penetration amounts by appropriately selecting a crystal with a refractive index suitable for the sample. In the embodiment, the ATR measurement was performed by using the diamond crystal. In this case, for example, the penetration amount is 1.4 μm at the wave number of 1407 $cm^{-1}$. The penetration amount is 2.4 μm at the wave number of 810 $cm^{-1}$.

TABLE 1

| ATR measurement crystal | Reflective index |
|---|---|
| KRS-5 | 2.397 |
| ZnSe | 2.405 |
| Ge | 4.005 |
| Diamond | 2.37 |
| Si | 3.421 |
| Chalcogenide | 2.8 |

In this characteristic test, 660/610IR made by VARIAN Inc. (current Agilent Technologies, Inc) was used as an apparatus for micro-ATR measurement using the FT-IR method. Moreover, a mercury cadmium telluride (MCT) detector was used as a detector. As measurement conditions, the scanning rate was set to 25 kHZ, the incidence angle was set to 45 degrees, the resolution was set to 4 $cm^{-1}$, and the aperture dimension was set to 100 μm×100 μm Moreover, the ultraviolet curing resin used for the secondary coating layer was evaluated before and after the curing process by performing the micro-ATR measurement using the FT-IR method. The absorption peak and the reference peak of the infrared light after and before the curing process can be obtained from the results of evaluation using the FT-IR method. Then, the double bond reaction percentage, that is the surface cure percentage of the ultraviolet curing resin, indicating the consumption amount of the acrylic double bond can be obtained from the absorption peak and the reference peak before and after the curing process, by using Formula 3.

[Math 3]

$$\text{Double Bond Reaction Percentage (\%)} = \left\{1 - \frac{H_{cured} \times A_{liquid}}{H_{liquid} \times A_{cured}}\right\} \times 100 \quad \text{Formula 3}$$

In this formula, $H_{cured}$ is the height of the absorption peak after the curing process, $H_{liquid}$ is the height of the absorption peak before the curing process, $A_{cured}$ is the area of the reference peak after the curing process, and $A_{liquid}$ is the area of the reference peak before the curing process. In order to accurately evaluate the double bond reaction percentage, it is necessary to select appropriate absorption peak and reference peak. Specifically, peaks appearing in all of materials to be evaluated need to be selected as the selected peaks. Moreover, it is preferable that the peaks do not overlap other peaks. Furthermore, it is preferable that a peak value or a peak area of the reference peak does not change as much as possible before and after the curing process. Accordingly, in this characteristics test, the micro-ATR measurement using the FT-IR method was performed on the secondary coating layer and the reference peak and the absorption peak were selected based on the result of the measurement.

One of three wave numbers of 1720 cm C=O (indicating a double bond between carbon and oxygen), 1487 to 1570 $cm^{-1}$ N—H (indicating a single bond between nitrogen and hydrogen), and 775 cm$^{-1}$ was selected, and either of the peak height or the peak area at the selected wave number was used as the reference peak. Table 2 depicts results of evaluation on multiple secondary coating layers A to I with different characteristics.

TABLE 2

| | 1720 cm$^{-1}$ | | | 1487 to 1570 cm$^{-1}$ | | | 730 to 775 cm$^{-1}$ | | |
|---|---|---|---|---|---|---|---|---|---|
| | 1720 cm$^{-1}$ C=O | Peak height ratio | Peak area ratio | 1510 cm$^{-1}$ N—H | Peak height ratio | Peak area ratio | 775 cm$^{-1}$ | Peak height ratio | Peak area ratio |
| A | x | 0.79 | 1.10 | ○ | 0.79 | 0.97 | ○ | 1.24 | 1.36 |
| B | x | 0.87 | 1.32 | ○ | 0.94 | 1.06 | ○ | 1.00 | 0.93 |
| C | x | 1.06 | 1.28 | ○ | 0.90 | 0.97 | ○ | 1.14 | 1.44 |
| D | ○ | 0.95 | 1.17 | ○ | 1.10 | 1.14 | ○ | 0.95 | 0.84 |
| E | ○ | 0.87 | 1.21 | ○ | 1.08 | 1.01 | ○ | 1.28 | 1.43 |
| F | x | 1.02 | 1.13 | ○ | 1.13 | 1.10 | ○ | 1.34 | 1.34 |
| G | ○ | 1.06 | 1.16 | ○ | 0.83 | 0.94 | x | No peak | |
| H | x | 0.70 | 1.00 | ○ | 0.96 | 0.93 | ○ | 1.04 | 1.26 |
| I | ○ | 0.84 | 1.15 | ○ | 1.03 | 1.12 | x | No peak | |
| Average | | 0.91 | 1.17 | | 0.97 | 1.03 | | 1.14 | 1.23 |

First, the peak appearing at 1720 cm$^{-1}$ was evaluated. As a result, it is found that the absorption peak appears near 1680 cm$^{-1}$ in the secondary coating layer to which a vinyl monomer is added. Accordingly, when the peak appearing at 1720 cm$^{-1}$ is used as the reference peak, this peak overlaps the peak near 1680 cm$^{-1}$ and a shoulder is formed in the peak. Hence, it is found that the peak appearing at 1720 cm$^{-1}$ is not suitable as the reference peak.

Next, the peak appearing at 775 cm$^{-1}$ was evaluated. As a result, it is found that no absorption peak appears near 775 cm$^{-1}$ in the secondary coating layers made of specific ultraviolet curing resins. Hence, it is found that the peak appearing at 775 cm$^{-1}$ is not suitable as the reference peak.

Note that, in Patent Documents 2 and 3, a peak at 810 cm$^{-1}$ indicating the acrylic double bond is used as the absorption peak, and a peak at 775 cm$^{-1}$ is used as the reference peak for the evaluation of the cure degree. However, it is found that the use of such peaks has a problem that the peak at 775 cm$^{-1}$ cannot be used as the reference peak for all coating materials because there are materials of the outermost layer which do not have the peak at 775 cm$^{-1}$.

Lastly, the peak appearing in 1487 to 1570 cm$^{-1}$ was evaluated. As a result, it is found that the peak is usable as the reference peak for the secondary coating layers of all configurations evaluated in this characteristics test. The ratio between the peaks before and after the curing process was 0.97 in terms of peak height and was 1.03 in terms of peak area. Accordingly, it is found that a change in the peak before and after the curing process is small, and this peak is suitable as the reference peak. Hence, in this characteristic test, the peak appearing in a range of 1487 to 1570 cm$^{-1}$ was selected as the reference peak.

Next, the selection of the absorption peak was studied. The absorption peaks include a peak at 810 cm$^{-1}$ (indicating C—H out-of-plane bending vibration) and a peak at 1407 cm$^{-1}$ (indicating C—H in-plane bending vibration). However, in a secondary coating layer made of a certain ultraviolet curing resin, no absorption peak appears near 810 cm$^{-1}$ Moreover, since the peak at 810 cm$^{-1}$ overlaps a base signal of the infrared light, it is difficult to set a base line for relative evaluation. Meanwhile, it is found that the peak appearing at 1407 cm$^{-1}$ is usable as the absorption peak for the secondary coating layers of all configurations evaluated in this characteristics test. Moreover, since the reference peak selected in this characteristic test is in the range of 1487 to 1570 cm$^{-1}$, the peak appearing at 1407 cm$^{-1}$ is closer to the reference peak than the peak appearing at 810 cm$^{-1}$ is. Furthermore, in the ATR measurement, the depth at which measurement can be performed varies depending on the wave number as depicted in FIG. 2. Since the penetration amount corresponding to the peak appearing at 1407 cm$^{-1}$ is smaller than the penetration amount corresponding to the peak appearing at 810 cm$^{-1}$, the portion near the surface of the secondary coating layer can be further evaluated. Hence, in this characteristic test, the peak appearing at 1407 cm$^{-1}$ was selected as the absorption peak.

The double bond reaction percentage of each of the multiple secondary coating layers having different characteristics was evaluated based on the measurement conditions described above. The double bond reaction percentage was evaluated in the portion near the surface of the secondary coating layer (specifically, at the depth of 1.4 μm from the surface). Furthermore, in order to evaluate the double bond reaction percentage in the deep portion of the secondary coating layer, the surface of the secondary coating layer was sliced off by using a microtome and similar evaluation was performed in a portion near the interface between the primary coating layer and the secondary coating layer (specifically, at the depth of 29.5 μm from the surface in Examples 1 to 4 and Comparative Examples 1 to 4 and at the depth of 34 μm from the surface in Examples 5 and 6).

<Knot Test>

Figure 3:
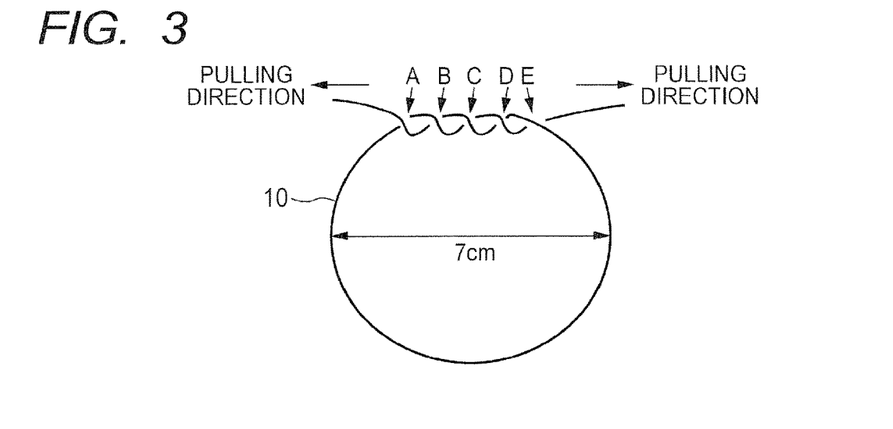
FIG. 3 is a schematic view illustrating an outline of Knot Test.

The kinetic friction force on the surface of each of the manufactured optical fibers was evaluated as in the evaluation by Knot Test disclosed in Patent Document 4. FIG. 3 is a schematic view illustrating an outline of Knot Test performed in this characteristic test. As illustrated in FIG. 3, a single loop was formed between one end and another end of the manufactured optical fiber. Then, the one end was made to pass through the loop twice to form a double knot and a circle with a diameter of about 7 cm was formed. In this state, the optical fiber was in contact with itself at five portions of points A to E. Both ends of the optical fiber were pulled at a rate of 5 mm/min with a tensile tester to measure the kinetic friction force on the surface of the optical fiber.

<Measurement of Surface Kinetic Friction Coefficient>

Figure 4A:
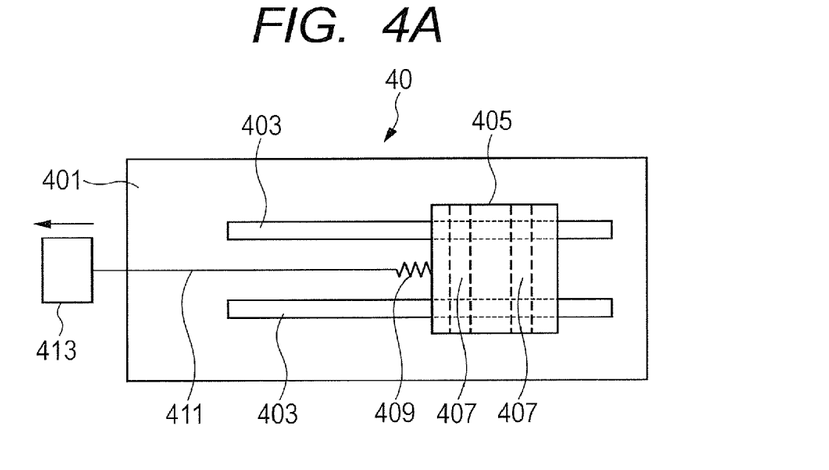
FIG. 4A is a top view of a surface kinetic friction coefficient measurement apparatus.
Figure 4B:
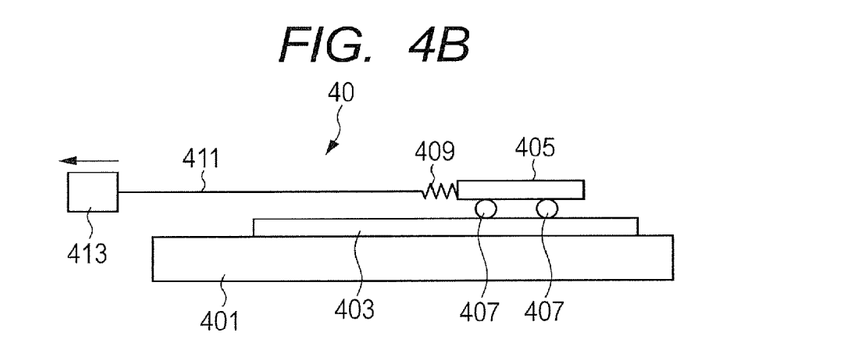
FIG. 4B is a side view of the surface kinetic friction coefficient measurement apparatus.

The kinetic friction coefficient on the surface of each optical fiber was evaluated by using the method disclosed in Patent Document 5. FIG. 4A is a top view of a surface kinetic friction coefficient measurement apparatus 40 used in this characteristic test. FIG. 4B is a side view of the measurement apparatus 40. As in FIGS. 4A and 4B, two optical fibers 403 were fixed parallel to each other on a horizontal table 401. A sliding piece 405 was placed on the two optical fibers 403 fixed parallel to each other. Two optical fibers 407 were similarly fixed to a bottom surface of the sliding piece. In the case of placing the sliding piece 405, the sliding piece 405 was placed such that the optical fibers 403 fixed on the table 401 and the optical fibers 407 fixed to the sliding piece were orthogonal to each other. Lastly, the sliding piece 405 was fixed to a load cell 413 via a spring 409 and a pulling thread 411 and a tension test was performed at a tension rate of 300 mm/min. In this test, the weight of the sliding piece 405 was 85 gf, the basic load application of the spring 409 was 0.29 N or 0.49 N, and the spring constant of the spring 409 was 0.031 N/mm or 0.047 N/mm. The load cell 413 was stopped after moving 100 mm from the start of the movement of the sliding piece 405. Force at the start of the movement was subtracted from a profile of the friction force obtained as described above and the average of the friction force during the movement was obtained as the kinetic friction force. A value obtained by dividing the obtained kinetic friction force by the weight of the sliding piece was obtained as the surface kinetic friction coefficient.

<Measurement of Glass-Transition Temperature>

The glass-transition temperature of the secondary coating layer of each optical fiber was evaluated. A measurement sample obtained by pulling out the glass optical fiber from the optical fiber and including only the coating was created by removing the coating with a stripper in liquid nitrogen. The glass-transition temperature Tg was measured by performing dynamic mechanical analysis (DMA) with RSA3 made by TA instruments. Specifically, the measurement was performed by a tensile method by using the aforementioned measurement sample obtained by pulling out the glass optical fiber from the optical fiber and including only the coating, under the conditions in which the gauge interval was 20 mm, the frequency was 1 Hz, and the temperature increase rate was 3° C./min. The temperature at which the maximum value of tan δ appeared was obtained as the glass-transition temperature Tg.

<Collectability>

The collectability of the secondary coating layer of each optical fiber was evaluated. In the case where the optical fibers are used to form a ribbon or a cable such as a loose tube cable, the optical fibers are collected before entering a die from a supply. In this case, the optical fibers pass pulleys and ceramic bars to change their directions. The optical fiber in the embodiment was thus made to pass pulleys and ceramic bars and the secondary coating layer in this case was evaluated.

Note that the case where the surface of the secondary coating layer (colored layer) is worn and turned into dust is indicated by x, the case where the surface is slightly worn is indicated by Δ, and the case where there is no problem is indicated by ○.

<Separability>

The separability of each optical fiber was evaluated by forming an optical fiber ribbon by arranging four optical fibers parallel to each other and collectively coating peripheries of the optical fibers with the ultraviolet curing resin.

Since the separability is a characteristic which greatly affects the workability in installation, a sensory measurement based on actual installation work was performed. Specifically, in the configuration of the optical fiber ribbon 50 illustrated in FIG. 5, a person vertically tore the optical fiber ribbon 50 from one end by inserting the nail between the second optical fiber 502 and the third optical fiber 503. The optical fiber ribbon 50 was thereby torn from the one end and separated into two units of a unit of the first and second optical fibers 501 and 502 and a unit of the third and fourth optical fibers 503 and 504. Lastly, the person tore each unit including the two optical fibers by inserting the nail between the two optical fibers and took out an individual optical fiber of optical fibers. This work was repeated ten times for each sample. A sample for which an individual optical fiber of optical fibers could be separated without tearing of the collective coating layer 505 on the peripheries of the optical fiber 501 and the optical fiber 504 at both ends was evaluated as a sample (○) which satisfied the desired separability. When the collective coating layer 505 on the peripheries of the optical fiber 501 and the optical fiber 504 were torn at least once in the test performed ten times and the collective coating layer 505 resultantly remained on the periphery of the optical fiber 501 or the optical fiber 504, this sample was evaluated as a sample (x) which did not satisfy the desired separability.

<Measurement of Immersing Transmission Loss>

The transmission loss of each optical fiber after immersing the optical fiber in water was evaluated as described below. The water resistance of the optical fiber was evaluated by immersing the optical fiber with the length of 1 km into warm water of 60° C. and measuring the transmission loss after the immersion. The transmission loss was measured by performing an optical time-domain reflectometry (OTDR) using optical pulse tester MW9076 made by Anritsu Corporation. The wavelength of a transmission signal was set to 1.55 μm. The measurement method was as follows. The transmission loss of the optical fiber before the immersion was measured. Then, the optical fiber was immersed in warm water of 60° C. for 30 days and 90 days and, after the immersion, the transmission loss was measured in a similar way. The transmission loss before the immersion and the transmission loss after the immersion were compared with each other to perform evaluation. When the transmission loss of the optical fiber increased by 0.05 dB/km or more, it was assumed that interlayer separation beyond an allowable range occurred in the optical fiber. Accordingly, an optical fiber whose increase of transmission loss after this measurement was less than 0.05 dB/km was evaluated to be an optical fiber resistant to water in a usage environment (○). Meanwhile, an optical fiber whose increase of transmission loss was 0.05 dB/km or more was evaluated to be an optical fiber not resistant water in the usage environment (x).

<Measurement Results and Evaluation>

Figure 6:
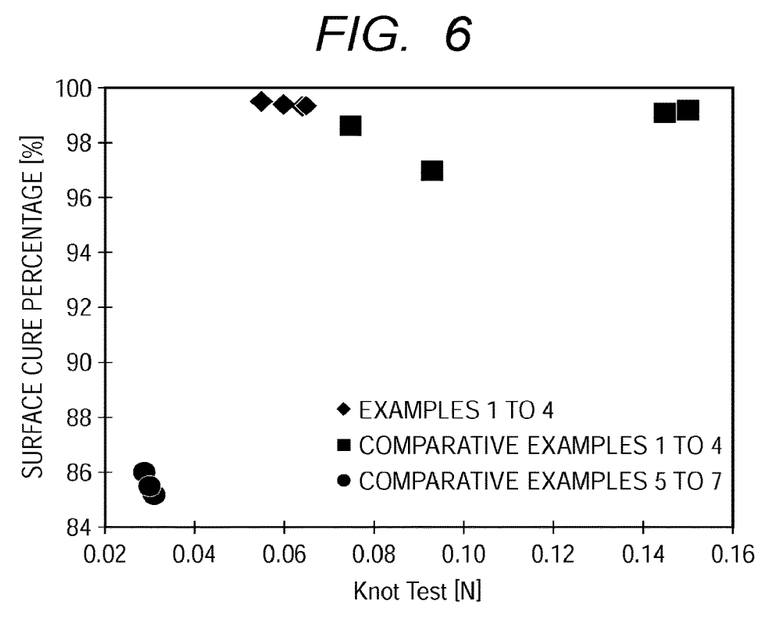
FIG. 6 is a view depicting a graph of relationships between the result of Knot Test and the surface cure percentage.

FIG. 6 is a view depicting a graph of relationships between the result of Knot Test and the surface cure percentage. The horizontal axis of FIG. 6 represents the kinetic friction force measured by Knot Test, and the vertical axis represents the surface cure percentage (double bond reaction percentage). It is found from the graph depicted in FIG. 6 that the two-layer structure optical fibers (Examples 1 to 4 and Comparative Examples 1 to 4) have higher double bond reaction percentages, that is surface cure percentages, than the three-layer structure colored optical fibers (Comparative Examples 5 to 7). Moreover, it is found that Examples 1 to 4 of the present invention have lower kinetic friction force than Comparative Examples 1 to 4.

Figure 7:
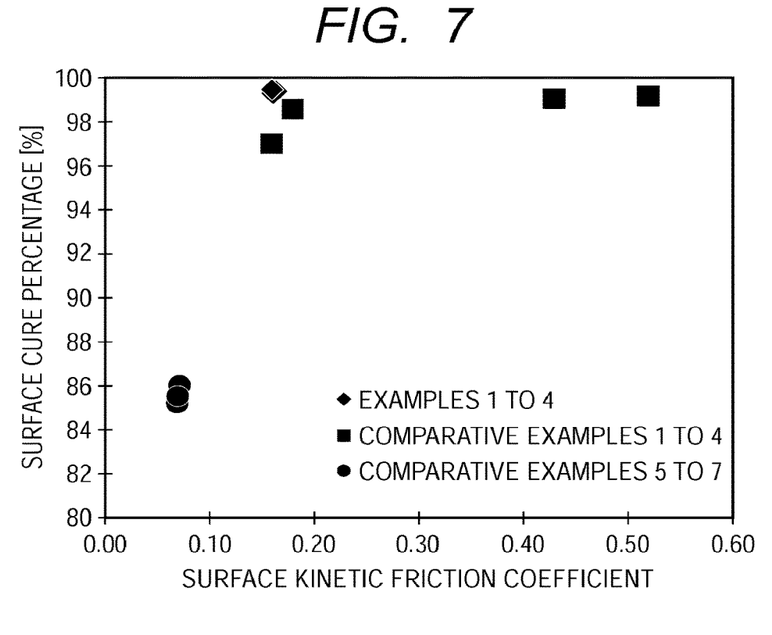
FIG. 7 is a view depicting a graph of relationships between a kinetic friction coefficient and a surface cure percentage.

FIG. 7 is a graph depicting relationships between the surface cure percentage and the kinetic friction coefficient. The horizontal axis of FIG. 7 represents the surface kinetic friction coefficient measured by using the measurement apparatus 40 of FIG. 4 and the vertical axis represents the surface cure percentage (double bond reaction percentage). It is found from the graph depicted in FIG. 7 that the two-layer structure colored optical fibers (Examples 1 to 4 and Comparative Examples 1 and 2) in which the secondary coating layers are colored have kinetic friction coefficients close to those of the three-layer structure colored optical fibers (Comparative Examples 5 to 7) having the colored layers. Meanwhile, it is found that the two-layer structure uncolored optical fibers (Comparative Examples 3 and 4) in which the secondary coating layers are not colored have higher kinetic friction coefficients than the two-layer structure colored optical fibers and the three-layer structure colored optical fibers.

Table 3 is a table depicting the measurement results and evaluation of the samples.

TABLE 3

|  | Example | | | | | | Comparative Example | |
|---|---|---|---|---|---|---|---|---|
|  | 1 | 2 | 3 | 4 | 5 | 6 | 1 | 2 |
| Young's modulus [MPa] of primary coating layer | 0.33 | 0.36 | 0.30 | 0.40 | 0.31 | 0.38 | 0.36 | 0.40 |
| Young's modulus [MPa] of secondary coating layer (colored layer) | 843 | 910 | 950 | 1000 | 1057 | 976 | 710 | 900 |
| Outer surface reaction percentage [%] of secondary coating layer (colored layer) | 99.3 | 99.4 | 99.4 | 99.5 | 99.3 | 99.1 | 98.6 | 97.0 |
| Inner surface reaction percentage [%] of secondary coating layer (colored layer) | 97.2 | 97.0 | 96.9 | 97.7 | 96.5 | 96.1 | 95.1 | 93.2 |
| Outer surface-inner surface reaction percentage [%] | 2.1 | 2.4 | 2.5 | 1.8 | 2.8 | 3.0 | 3.5 | 3.8 |
| Knot test [N] | 0.064 | 0.065 | 0.060 | 0.055 | 0.066 | 0.068 | 0.075 | 0.093 |
| Surface kinetic friction coefficient | 0.162 | 0.160 | 0.165 | 0.160 | 0.163 | 0.168 | 0.180 | 0.160 |
| Primary coating outer diameter [μm] | 183 | 183 | 183 | 183 | 184 | 184 | 183 | 183 |
| Outermost layer coating outer diameter [μm] | 242 | 242 | 242 | 242 | 252 | 252 | 242 | 242 |
| Secondary coating layer glass-transition temperature [° C.] | 83 | 95 | 98 | 95 | 100 | 97 | 84 | 95 |
| Collectability | ○ | ○ | ○ | ○ | ○ | ○ | Δ | Δ |
| Separability | ○ | ○ | ○ | ○ | ○ | ○ | x | x |
| Increase in transmission loss [dB/km] after immersion in warm water for 30 days | 0.00 | 0.00 | 0.00 | 0.00 | 0.00 | 0.00 | 0.01 | 0.01 |
| Increase in transmission loss [dB/km] after immersion in warm water for 90 days | 0.01 | 0.01 | 0.01 | 0.01 | 0.02 | 0.01 | 0.02 | 0.02 |
| Water resistance determination | ○ | ○ | ○ | ○ | ○ | ○ | ○ | ○ |
| Overall judgment | ○ | ○ | ○ | ○ | ○ | ○ | x | x |

|  | Comparative Example | | | | |
|---|---|---|---|---|---|
|  | 3 | 4 | 5 | 6 | 7 |
| Young's modulus [MPa] of primary coating layer | 0.67 | 0.35 | 0.60 | 0.80 | 0.70 |
| Young's modulus [MPa] of secondary coating layer (colored layer) | 954 | 900 | 1400 | 2000 | 1300 |
| Outer surface reaction percentage [%] of secondary coating layer (colored layer) | 99.1 | 99.2 | 85.2 | 86.0 | 85.5 |
| Inner surface reaction percentage [%] of secondary coating layer (colored layer) | 98.5 | 98.2 | — | — | — |
| Outer surface-inner surface reaction percentage [%] | 0.6 | 1.0 | — | — | — |
| Knot test [N] | 0.145 | 0.150 | 0.031 | 0.029 | 0.030 |
| Surface kinetic friction coefficient | 0.430 | 0.520 | 0.070 | 0.072 | 0.070 |
| Primary coating outer diameter [μm] | 195 | 183 | 183 | 195 | 196 |
| Outermost layer coating outer diameter [μm] | 242 | 242 | 255 | 255 | 255 |
| Secondary coating layer glass-transition temperature [° C.] | 85 | 95 | 82 | 104 | 95 |
| Collectability | Δ | Δ | ○ | ○ | ○ |
| Separability | x | x | ○ | ○ | ○ |
| Increase in transmission loss [dB/km] after immersion in warm water for 30 days | 0.02 | 0.01 | 0.07 | 0.15 | 0.24 |
| Increase in transmission loss [dB/km] after immersion in warm water for 90 days | 0.02 | 0.01 | 0.15 | 0.31 | 0.55 |
| Water resistance determination | ○ | ○ | x | x | x |
| Overall judgment | x | x | x | x | x |

The following facts are found from the evaluation results depicted in Table 3: Examples 1 to 6 which are the two-layer structure colored optical fibers in the present invention, where the surface cure percentage is 99% or more, the difference in the surface cure percentage (double bond reaction percentage) between the portion near the outermost peripheral surface and the portion near the inner peripheral surface of the secondary coating layer is 3.0% or less, and the friction force in Knot Test is less than 0.075 N, have such excellent characteristics that Examples 1 to 6 can withstand the usage environment in the evaluation of the collectability, the separability, and the warm water resistance.

In each of the two-layer structure colored optical fibers of Comparative Examples 1 and 2 and the uncolored optical fibers of Comparative Examples 3 and 4, the surface cure percentage is less than 99% or the friction force in Knot Test is 0.075 N or more. It is found that, in the evaluation of the collectability and the separability depicted in Table 3, the optical fibers of Comparative Examples 1 to 4 do not have such characteristics that Comparative Examples 1 to 4 can withstand the usage environment. This is because the surface tackiness is high and the friction force thereby increases.

Moreover, it is found from Table 3 that, in each of the three-layer structure colored optical fibers of Comparative Examples 5 to 7, the transmission loss greatly increases due to immersion in warm water for 30 days or 90 days. This is because stress is generated in an interface between the stiff colored layer and the secondary coating layer and this stress causes interlayer separation in an interface between the glass optical fiber and the primary coating layer.

Since the three-layer structure colored optical fiber having the colored layer on the outer periphery of the secondary coating layer is stiffer than the two-layer structure colored optical fiber, stress is more likely to be generated in the interface between the colored layer and the secondary coating layer. When the optical fiber is immersed in warm water of 60° C., this stress is transmitted as stress which tends to separate the glass optical fiber and the primary coating layer from each other in the interface therebetween, and resultantly causes interlayer separation in the interface between the glass optical fiber and the primary coating layer. Water accumulates in a portion of the interlayer separation and soluble contents in the coating layer dissolve into the accumulated water to form a solution. Osmotic pressure is generated to decrease the concentration of the solution. This osmotic pressure attracts more water. As a result, the interlayer separation increases to a point where a glass portion of the optical fiber is bent (micro bent) and the transmission loss increases.

Meanwhile, the two-layer structure colored optical fibers of Examples 1 to 6 have better warm water resistance than the three-layer structure colored optical fibers having the colored layer. For example, when the colored optical fibers are immersed in warm water of 60° C., there is a case where residual stress between the glass optical fiber and the primary coating layer becomes high and interlayer separation (delamination) resultantly occurs in the interface between glass optical fiber and the primary coating layer. However, in the colored optical fibers having the two-layer structure, no hard colored layer like those in Comparative Example 5 to 7 exists on the outer periphery of the secondary coating layer. Accordingly, the residual stress is quickly relaxed when the interlayer separation occurs. Hence, the frequency and magnitude of the interlayer separation is relatively small and the change in the transmission loss is relatively small.

In each of the two-layer structure colored optical fibers in Examples 5 and 6, the double bond reaction percentage in a portion near the interface between the primary coating layer and the secondary coating layer which is a portion at the depth of 34 μm from the surface is 96.1% to 96.5%, and the difference in the double bond reaction percentage between the portion near the outermost peripheral surface and the portion near the inner peripheral surface of the secondary coating layer is 2.8% to 3.0%, which is within a range of 3.0% or less. Moreover, in each of the two-layer structure colored optical fibers in Examples 1 to 4, the double bond reaction percentage at the depth of 29.5 μm is 97% to 97.5%, and the difference in the double bond reaction percentage between the portion near the outermost peripheral surface and the portion near the inner peripheral surface of the secondary coating layer is 1.8% to 2.5%, which is within a range of 2.5% or less.

Since the conventional colored secondary coating layer (Comparative Examples 1 and 2) contain a coloring pigment and titanium oxide, light scatters and the reaction percentage is lower than that in the clear secondary coating layer (Comparative Examples 3 and 4) including no pigment. Accordingly, the double bond reaction percentage in the portion near the inner peripheral surface is far lower than the double bond reaction percentage in the portion near the outermost peripheral surface, and the difference in the double bond reaction percentage between the portion near the outermost peripheral surface and the portion near the inner peripheral surface of the secondary coating layer is greater than 3.0%. In this state, the ultraviolet curing resin in the portion near the inner peripheral surface of the secondary coating layer is not sufficiently cured and the interlayer separation is thus likely to occur in the immersion in warm water. As a result, an increase in transmission loss after the immersion in warm water for 30 days sometimes becomes slightly greater.

Meanwhile, in each of Examples 1 to 6, since the difference in the double bond reaction percentage between the portion near the outermost peripheral surface and the portion near the inner peripheral surface of the secondary coating layer is 3.0% or less, it is possible avoid the case where the stress generated near the outermost peripheral surface is applied to the interface between the inner peripheral surface and the glass optical fiber. As a result, it is possible to suppress the interlayer separation in the interface between the primary coating layer and the glass optical fiber and suppress the change in the transmission loss to a small level when the colored optical fiber is immersed in warm water of 60° C.

In the embodiment of the present invention, the surface cure percentage of the secondary coating layer in the two-layer structure colored optical fiber is 99% or more at the peak of 1407 cm$^{-1}$ in the infrared region, the difference in the surface cure percentage between the outer peripheral surface near the surface and the inner peripheral surface near the interface between the primary coating layer and the colored secondary coating layer is 3.0% or less (preferably, 2.5% or less), and the friction force in Knot Test is adjusted to be 0.075 N or less. This improves the slippage of the colored optical fibers in collection thereof. Furthermore, excellent separability can be obtained, the separability being a separation characteristic index in the case where an optical fiber ribbon is manufactured by using the colored optical fibers.

Moreover, the warm water resistance in the case where the optical fiber is immersed is also excellent.

The invention claimed is:

1. A two-layer structure colored optical fiber comprising:
a glass optical fiber;
a primary coating layer coating the glass optical fiber; and
a colored secondary coating layer coating the primary coating layer, a surface cure percentage of the colored secondary coating layer being 99% or more at an infrared absorption peak of a wave number of 1407 cm$^{-1}$, a difference in the surface cure percentage between a portion near a surface of the colored secondary coating layer and a portion near an interface between the primary coating layer and the colored secondary coating layer being 3.0% or less, a surface kinetic friction force in Knot Test of the colored secondary coating layer being less than 0.075 N.

2. The two-layer structure colored optical fiber according to claim 1, wherein the colored secondary coating layer contains:
an ultraviolet curing resin;
a first photoinitiator having an absorption peak in a short wavelength region of 200 to 350 nm; and
a second photoinitiator having an absorption peak in a long wavelength region of 350 to 450 nm.

3. The two-layer structure colored optical fiber according to claim 2, wherein the colored secondary coating layer is cured by being irradiated with ultraviolet light emitted from both of a first ultraviolet light source having stronger emission intensity in the short wavelength region than in the long wavelength region and a second ultraviolet light source having stronger emission intensity in the long wavelength region than in the short wavelength region.

4. An optical fiber ribbon in which a plurality of the two-layer structure colored optical fibers according to claim 1 are arranged and coated with a collective coating layer made of a resin.

5. An overcoat optical fiber in which the two-layer structure colored optical fiber according to claim 1 is coated with an overcoat layer made of a resin.

6. A manufacturing method of a two-layer structure colored optical fiber, comprising the steps of:
coating a glass optical fiber with a primary coating layer; and
coating the primary coating layer with a colored secondary coating layer, a surface cure percentage of the colored secondary coating layer being 99% or more at an infrared absorption peak of a wave number of 1407 cm$^{-1}$, a difference in the surface cure percentage between a portion near a surface of the colored secondary coating layer and a portion near an interface between the primary coating layer and the colored secondary coating layer being 3.0% or less, a surface kinetic friction force in Knot Test of the colored secondary coating layer being less than 0.075 N.

7. The manufacturing method according to claim 6, wherein the colored secondary coating layer contains:
an ultraviolet curing resin;
a first photoinitiator having an absorption peak in a short wavelength region of 200 to 350 nm; and
a second photoinitiator having an absorption peak in a long wavelength region of 350 to 450 nm.

8. The manufacturing method according to claim 7, wherein, the step of coating the primary coating layer with the colored secondary coating layer includes the steps of:
irradiating the colored secondary coating layer with ultraviolet light emitted from a first ultraviolet light source having stronger emission intensity in the short wavelength region than in the long wavelength region; and
irradiating the colored secondary coating layer with ultraviolet light emitted from a second ultraviolet light source having stronger emission intensity in the long wavelength region than in the short wavelength region.

* * * * *